3,026,264
SUBSTITUTED BENZENES
Albert L. Rocklin, Walnut Creek, and John L. Van Winkle, San Lorenzo, Calif., assignors to Shell Oil Company, New York, N.Y., a corporation of Delaware
No Drawing. Filed July 11, 1960, Ser. No. 41,737
19 Claims. (Cl. 252—52)

This invention relates to novel polynuclear polyphenols and to stabilized compositions containing such compounds. More specifically, the invention relates to novel tri-hydroxybenzyl)benzenes to stabilized compositions containing them.

Such alkylated phenols as 2,6-di-tert-butyl-4-methylphenol and 2,4-dimethyl-6-tert-butylphenol have been found to be useful as stabilizers for rubber, gasoline and lubricating oil, polyolefins such as polyethylene and the like. These compounds are, however, quite volatile at high temperatures and are therefore inadequate for stabilizing materials which are heated to these temperatures during manufacture or use. As a consequence, a need has arisen for compounds which combine good high-temperature stabilizing properties with low volatility. Such properties are particularly important for stabilizers to be employed in lubricating oil, which is subjected to high motor temperatures, and to normally solid polymeric hydrocarbons which are extruded or molded at temperatures such that the polymer is plastic or fluid.

In particular, stabilizers are needed for such polymeric alpha-olefins as polyethylene and polypropylene, and their higher homologs. These polymers are frequently prepared by the low pressure method, employing metal alkyl or "Ziegler" catalysts, such as triethyl aluminum. One disadvantage of this low pressure method is that the polymers so produced are particularly susceptible to degradation by light, heat, oxygen or their combination. The effect of this deterioration is to render the polymers brittle and inflexible and to lower their tensile strength, thus reducing their usefulness for most applications. It is not certain why these polymers are susceptible to such deterioration. It has been proposed that they contain residual metallic traces of the polymerization catalyst, and these residues may cause the degradation. As a consequence, it has been necessary to incorporate in the polymeric alpha-olefins stabilizers which protect the composition against such loss of its useful properties.

To combat this degradation, the use of a variety of stabilizers has been suggested. No single chemical compound has, however, afforded protection against oxidative, thermal and ultraviolet attack. For example, conventional mononuclear alkylated phenols, while affording some protection against oxidative deterioration, are too volatile to be useful during high temperature processing.

It has therefore been necessary to include in the polymer a particular stabilizer for each of the sources of deterioration. As a consequence, olefinic polymers prepared by low pressure methods are currently formulated and marketed with as many as three to five different stabilizers, each having only a single stabilizing activity. The use of a plurality of stabilizers is both expensive and not entirely satisfactory, since a high degree of product stability has not been achieved even with their inclusion.

Furthermore, these stabilizers are not always effective to prevent discoloration of the polyolefin composition. Indeed, in many cases, the discoloration of the polymers is increased by the stabilizer. While discoloration is not important for polymers intended for pipe and wire coating applications, it assumes importance for polymers used in packaging and in the manufacture of light-colored household goods.

It is an object of this invention to provide a new class of polynuclear polyphenols having superior stabilizing properties. A single stabilizer which will afford protection to polyolefins against all of the sources of degradation listed is another object of the invention. Another object is the novel process for preparing such phenols. Provision of stabilized organic compositions containing the polynuclear polyphenols of the invention is another object, as is the provision of non-discoloring polyolefin compositions. Other objects will be apparent from the following detailed description of the invention.

These objects are accomplished by the novel polynuclear polyphenol having a benzene ring substituted with three 3,5-dialkyl-4-hydroxybenzyl radicals and with three alkyl radicals. In such compounds each of the ring carbon atoms of the benzene ring is attached to one of the radicals described, each of the 3,5-dialkyl-4-hydroxybenzyl radicals being attached to each of three ring carbon atoms, and each of three alkyl radicals being attached to each of the three remaining ring carbon atoms. These compounds can be generally described by the formula

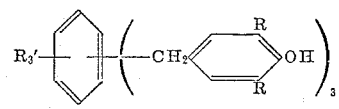

wherein each R and R' is an alkyl radical, preferably having up to eight carbon atoms. Since compounds having hindered phenolic hydroxyl groups are most satisfactory stabilizers, it is preferred that at least one, and most preferably both, of the alkyl substituents R adjacent the hydroxyl groups have from 3 to 8 carbon atoms and be branched on the alpha carbon atom.

Representative compounds of this formula include 1,2,4 - trimethyl - 3,5,6 - tri(3 - methyl - 5 - isopropyl - 4 - hydroxybenzyl)benzene; 1,2,5 - triethyl - 3,4,6 - tri(3,5-diisopropyl - 4 - hydroxybenzyl)benzene; 1,2,4 - tripropyl - 3,5,6 - tri(3 - ethyl - 5 - tert - butyl - 4 - hydroxybenzyl)benzene; 1,2,4 - trioctyl - 2,3,5 - tri(3 - hexyl-5-tert-amyl-4-hydroxybenzyl)benzene; and the like. Also typical are compounds wherein the R' substituents on the ring differ from one another, such as 1,2-dimethyl-5-ethyl-3,4,6 - tri(3 - amyl - 5 - tert - butyl - 4 - hydroxybenzyl)benzene and 1-methyl-2,4-dibutyl-3,5,6-tri(3,5-di-tert-hexyl-4-hydroxybenzyl)benzene.

In general, it has been found that the symmetrical hexasubstituted benzenes are the most effective stabilizers as well as being the easiest compounds to prepare. These compounds are the 1,3,5-trialkyl-2,4,6-tri(3,5-dialkyl-4-hydroxybenzyl)benzenes having the structure

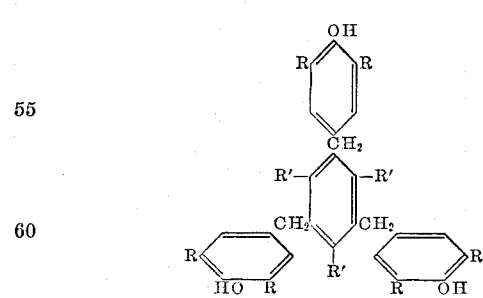

wherein each R and R' has the significance set forth above. In the preferred embodiment of these compounds, R' is a lower alkyl radical having from 1 to 4 carbon atoms, and each R is an alkyl radical having from 3 to 8 carbon atoms and is branched on the alpha carbon atom. Such compounds are exemplified by 1,3,5-trimethyl-2,4,6-tri(3,5 - diisopropyl - 4 - hydroxybenzyl)benzene; 1,3,5-triethyl - 2,4,6 - tri(3,5 - di - tert - amyl - 4 - hydroxybenzyl)benzene; 1,3,5-tributyl - 2,4,6 - tri(3 - isopropyl-5-tert-amyl-4-hydroxybenzyl)benzene; and 1,3,5-tripropyl - 2,4,6 - tri(3,5 - di - tert - octyl - 4 - hydroxybenzyl) benzene. Of these, the most preferred antioxidant is that class having three 3,5-di-tert-butyl-4-hydroxybenzyl radicals, since these appear to be the best antioxidants.

These compounds may be best understood by consideration of the manner in which they are prepared. In general, they may be most conveniently prepared by alkylating a trialkylbenzene with 3,5-dialkyl-4-hydroxybenzyl alcohol under alkylating conditions and in the presence of sulfuric acid or a Friedel-Crafts catalyst. Since at room temperature the reactants are solids in most cases, the alkylation is preferably conducted in the liquid phase in an inert solvent.

The trialkylbenzene reactants are those benzenes having an alkyl substituent attached to each of three ring carbon atoms and a replaceable hydrogen atom on each of the remaining three ring carbon atoms. Preferably, the alkyl radicals are those having from one to eight carbon atoms. Typical trialkylbenzenes are 1,2,4-trimethylbenzene; 1,2,5-triethylbenzene; 1,2-dimethyl-4-hexylbenzene; 1,2,4-triheptylbenzene; and 1,2,5-trioctylbenzene. Preferred reactants are those symmetrical trialkylbenzenes wherein each of the ring carbon atoms in the 1, 3 and 5 positions is substituted with a lower alkyl radical, that is, an alkyl radical having up to four carbon atoms. Not only are these symmetrical trialkylbenzenes more readily trialkylated than their asymmetric isomers, but antioxidants prepared from them are better stabilizers. Exemplary trialkylbenzenes of this preferred class are 1,3,5-trimethylbenzene; 1,3,5-triethylbenzene; 1,3,5-triisopropylbenzene; and 1,3,5-tributylbenzene.

The trialkylbenzene is reacted with 3,5-dialkyl-4-hydroxybenzyl alcohol to form the novel hexa-substituted benzene of the invention. The alcohol employed may be represented by the formula

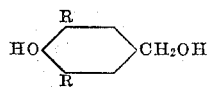

wherein each R is alkyl, preferably having up to 8 carbon atoms. The alcohol may, of course, have other such alkyl substituents on ring carbon atoms in the 2 and 4 positions.

The most effective antioxidants are prepared by hydroxybenzyl alcohols wherein the hydroxyl group is sterically hindered by the adjacent alkyl groups, and for this reason it is preferred that at least one and preferably both of the alkyl groups R on the benzyl ring be branched on the alpha carbon atom. Typical alcohols include 3,5-dimethyl-4-hydroxybenzyl alcohol; 3-ethyl-5-butyl-4-hydroxybenzyl alcohol; 3-hexyl-5-octyl-4-hydroxybenzyl alcohol; and 3,5-dioctyl-4-hydroxybenzyl alcohol. Preferred alcohols having branched alkyl substituents R include 3-methyl-5-isopropyl-4-hydroxybenzyl alcohol; 3-ethyl-5-tert-butyl-4-hydroxybenzyl alcohol; 3-ethyl-5-sec-butyl-4-hydroxybenzyl alcohol; 3-butyl-5-tert-amyl-4-hydroxybenzyl alcohol and 3-octyl-5-tert-hexyl-4-hydroxybenzyl alcohol. Most preferred alcohols, wherein both of the alkyl substituents R are branched on the alpha carbon atom are exemplified by 3,5-diisopropyl-4-hydroxybenzyl alcohol; 3,5-di-tert-butyl-4-hydroxybenzyl alcohol; 3-isopropyl-5-tert-butyl-4-hydroxybenzyl alcohol; 3,5-di-tert-amyl-4-hydroxybenzyl alcohol; 3,5-di-sec-octyl-4-hydroxybenzyl alcohol; and the like.

The trialkylbenzene and the hydroxybenzyl alcohol are reacted together under alkylating conditions in the presence of a catalytic amount of a compound selected from sulfuric acid and Friedel-Crafts catalysts. By Friedel-Crafts catalysts are meant such catalysts as aluminum trihalides, such as aluminum trichloride and aluminum tribromide; zirconium tetrachloride; tantalum pentachloride; beryllium dichloride; titanium tetrachloride; boron trifluoride; hydrogen fluoride; tin tetrachloride; ferric trichloride and zinc dichloride. The catalyst is employed in amounts ranging from about 0.1% to about 100% by weight, based on the hydroxybenzyl alcohol, with the preferred amount being from about 1% to about 10% on the same basis, although a catalyst such as sulfuric acid may be used in large excess and then recycled.

The reaction is facilitated if a dehydrating agent is employed with the Friedel-Crafts catalyst. Of these agents, the most effective is phosphorus pentoxide. The amount employed is preferably that percentage by weight about equal to the amount of catalyst used.

The reaction is conducted in the liquid phase, most conveniently in solution in an inert solvent. Suitable solvents include the paraffins, particularly those having between five and ten carbon atoms, such as pentane, isopentane, hexane, cyclohexane, heptane, octane, isooctane and decane; as well as the mixture of hydrocarbons known as "petroleum ether." Also useful are halogenated solvents such as carbon tetrachloride or chloroform and the alkylene halides such as methylene chloride, ethylene dichloride, propylene dibromide and the like, alkylene halides up to $C_4$ being preferred. Ethers such as diethyl ether, methyl ethyl ether, diisopropyl ether and dioxane may also be used. In general, solvents liquid at the reaction temperature and boiling at or above about 50° C. are most useful.

The alkylation of the trialkylbenzene with the 3,5-dialkyl-4-hydroxybenzyl alcohol of the invention is conveniently conducted at atmospheric pressure and below the boiling temperature of the solvent, i.e., at temperatures between about −15° C. to about 100° C. While subatmospheric or superatmospheric pressures may be employed, their use only increases the expense of the process without affording material advantages in rate or yield. Since the alkylation under the conditions described takes place with convenient rapidity at temperatures at or below about 50° C., higher temperatures will generally not be required.

The reaction is readily performed by mixing the reactants and catalyst in the solvent and, after the reactants have been consumed to the desired degree, terminating the reaction by removing the catalyst or inactivating it with water, complexing, or by some other method known in the art. The product may be simply separated from the reaction mixture by such methods as distillation, extraction, crystallization or the like. While this description has set forth the process in terms of a batch process, the reaction may also be conducted in a semi-batch or continuous manner.

The pure products are white or light-colored crystalline solids at room temperature and usually have relatively high melting and boiling points. They are insoluble in water but soluble in hydrocarbon and polar organic solvents and generally miscible with organic solid substrates. They have superior thermal stabilizing properties and relatively low volatility and are therefore particularly effective as antioxidants for materials which during preparation or use are subjected to elevated temperatures.

One surprising and advantageous property of the hexasubstituted benzenes of the invention is their resistance to discoloration in polymeric alpha-olefin compositions. It has been observed that when 3,5-dialkyl-4-hydroxybenzyl benzenes wherein the benzene nucleus has replaceable hydrogen atoms are employed as stabilizers in such compounds as polyethylene or polypropylene, the resulting composition, while possessing excellent thermal and oxidation stability, discolors seriously on heating or on exposure to sunlight or other sources of ultraviolet radiation. Depending on the nature of the stabilizer and substrate, such colors as brown, blue, green and pink are obtained in the course of prolonged irradiation. While the development of such colors does not impair the performance of the polymer, it does render it unsuitable for many consumer applications such as packaging uses, containers, homeware, and the like.

Unexpectedly, it has been found that with benzene compounds wherein each of the ring carbon atoms is substituted with either an alkyl radical or a 3,5-dialkyl-4-hydroxybenzyl radical, little or no discoloration is obtained. Thus, not only are the hexa-substituted benzenes of the invention superior thermal and oxidation stabilizers in synthetic resins, but they are also comparatively non-discoloring. They are thus particularly well suited for incorporation in light-colored polymeric alpha-olefins as well as other substrates wherein thermal or ultraviolet induced discoloration is a problem. In general, however, the hexa-substituted benzenes will afford improved oxidation resistance to organic materials normally subject to oxidative deterioration, whether or not the material is prone to discoloration.

One class of compositions of the type described are those comprising a polymerized alpha-olefin containing a stabilizing amount of the 3,5-dialkyl-4-hydroxybenzyl hydrocarbons of the invention wherein each of the alkyl radicals on said hydroxybenzyl radical has from 3 to 8 carbon atoms and is branched on the alpha carbon atom. Preferred polymers for the compositions of this invention are those normally solid polymers of alpha-olefins having up to three carbon atoms, e.g., ethylene and propylene, and their copolymers.

The polymers of alpha-olefins stabilized by the compounds of the invention are those normally solid hydrocarbon polymeric materials which are obtained by polymerizing such monoolefins as ethylene, propylene, butene-1, pentene-1, 3-methyl-butene-1, hexene-1, 4-methylpentene-1, 4-methyl-hexene-1, 4,4-dimethyl-pentene-1, and the like, as well as their copolymers, e.g., ethylene-propylene copolymers and the like. By "stabilizing amount" is meant an amount of the hydroxbenzyl compound sufficient to stabilize the composition against oxidative, thermal and ultraviolet deterioration, generally from about 0.005% w. to about 1% w. of the total composition.

The polymers are preferably those prepared by low pressure polymerization methods and, accordingly, they may contain trace amounts of metallic catalyst residues, particularly transition metals of Groups IV–VI of the Mendelyeev Periodic Table, and metal residues of a Group I–III metal. For example, many low pressure polymers will contain traces of titanium and aluminum or such other metals as vanadium and zirconium, depending on the particular "Ziegler" catalyst employed in the polymerization. Additionally, the polymers often may contain small amouts of free iron, an impurity which is incorporated in the polymer from the steel apparatus in which polymerization is conducted.

The polymeric alpha-olefin may be in the form of molding powder, sheets, films, rods, tube, molded forms or the like. Irrespective of the physical form of the polymer, the novel hydroxbenzyl trialkylbenzenes of the invention are useful to impart improved resistance to all forms of embrittlement and degradation.

Typical elastomers in which the substituted benzene compounds of the invention may be employed include natural rubber (*Hevea brasiliensis*) and such synthetic rubberlike elastomers as SBR, polybutadiene, cis-1,4-polyisoprene, neoprene, butyl rubber and polyacrylonitrile. All of these deteriorate in the presence of oxygen and ozone by hardening, cracking and checking, and thus losing their resilience and mechanical strength. When these rubbers are processed, as by milling, curing or molding, they are subjected to high temperatures which tend to volatilize some or all of the stabilizer in the rubber. However, the incorporation into the rubber of the hydroxybenzyl benzene compounds of the invention renders the resulting rubber composition resistant to oxidative deterioration during processing, since these novel stabilizers are both heat-stable and almost completely non-volatile. As a consequence, the rubber compositions stabilized with these compounds have better retention of color, strength, elasticity and resistance to cracking, checking and tearing than rubber compositions containing less stable antioxidants. The hexa-substituted benzene compounds may thus be added to the rubber at the latex stage during processing on Banbury mills or included with other substances added to the rubber during the course of manufacture.

The substituted benzenes are also sufficiently soluble in such hydrocarbons as gasoline, fuel oil, and lubricating oils and greases so that they may be incorporated in stabilizing amounts in such materials. Alternatively, they may be employed as inhibitors in such polymerizable liquid ethylenically unsaturated monomers as vinyl-benzenes, including styrene, vinyltoluene and divinylbenzene; acrylates, including methyl acrylate, ethyl acrylate and 2-ethylhexyl acrylate; methacrylates, including methyl methacrylate and ethyl methacrylate; acrylonitrile, and the like, where traces of oxygen in the monomer may initiate undesirable premature polymerization.

The hexa-substituted benzenes of the invention are also miscible with and impart enhanced stability to natural fats and oils. Typical stabilized compositions containing the benzenes include those wherein the major portion is an edible oil such as menhaden oil, cod liver oil, safflower oil, castor oil, olive oil, sesame oil, peanut oil, babassu oil, palm oil, corn oil or the like. Fats stabilized with the substituted benzenes include oleomargarine, lard, butter, beef tallow, animal fat and hydrogenated vegetable shortening products, such as those sold under such trade names as "Spry," "Crisco," "Snowdrift," and the like.

In general, in the stabilized compositions containing the novel benzene compounds described, only an amount of any particular compound sufficient to stabilize the material against oxidative deterioration will be required. The requisite amount will, of course, depend both on the efficacy of the particular hexa-substituted benzene and on the nature of the normally oxidizable substrate in which it is employed. It has been found that amounts of the benzene compounds from about 0.0001% by weight to about 10% by weight, based on the organic substrate, are sufficient. For example, suitable concentrations of the benzene compounds in distillate fuels, e.g., kerosene, furnace oil, are on the order of 0.0007% w. to about 0.0028% w., while in rubber somewhat larger amounts, up to about 10% w., are required.

It will be understood that, in addition to containing a stabilizing amount of the dialkyl hydroxybenzyl trialkyl benzene compounds described, the organic compositions of the invention may contain such other ingredients as other antioxidants, coloring agents, and the like. For example, in rubber or plastic compositions such additives as pigments, fillers, antiozonants and curing agents will be employed, while in fuel compositions such additives as anti-icing agents, dyes, antiknock and anti-miss agents and similar conventional ingredients will be found. Lubricants will contain gelling agents, extreme pressure additives and such other materials as are employed in commercial preparations. These additives will not interfere with the superior stabilizing effect to the hydroxybenzyl benzene compounds of the invention.

To illustrate the novel benzene compounds of the invention, their preparation and their uses, th following examples are given. It should be understood, however, that these examples are merely illustrative and are not to be regarded as limitations to the appended claims since the basic teachings thereof may be varied at will as will be understood by one skilled in the art. In the examples, the proportions are expressed in parts by weight unless otherwise noted.

EXAMPLE I

To a stirred mixture of 94.4 g. (0.4 mole) of 3,5-ditert-butyl-4-hydroxybenzyl alcohol, 12.03 g. (0.1 mole) of mesitylene (1,3,5-trimethylbenzene) and 400 ml. methylene chloride at 4° C. was added 80 g. 80% sulfuric acid, over a 33-minute period. The mixture was stirred for an additional two hours fifty minutes. At the end of this time the mixture was washed with water four times to remove the acid, and the methylene chloride solvent evaporated off. The residue was a viscous liquid which crystallized on stirring. The crystals were broken up and recrystallized from isopentane. In this way 57.8 g. of a pure white crystalline compound having a melting point of 200.0°–200.7° C. was obtained. Analysis showed it to be 1,3,5-trimethyl-2,4,6-tri(3,5-di-tert-butyl-4-hydroxybenzyl)benzene.

EXAMPLE II

Employing the method of the previous example 0.3 mole of 3,5-diisopropyl-4-hydroxybenzyl alcohol is reacted at about 25° C. with 0.1 mole of 1,2,4-triethylbenzene in ethylene dichloride in the presence of about 10% w., based on the triethylbenzene, of ethereal boron trifluoride.

Upon work-up, there is obtained a substantial yield of 1,2,4-triethyl-3,5,6-tri(3,5-diisopropyl-4-hydroxybenzyl)benzene.

EXAMPLE III

The 1,3,5-trimethyl-2,4,6-tri(3,5-di-tert-butyl-4-hydroxy-benzyl)benzene prepared in Example I was evaluated as a stabilizer in polypropylene. Polypropylene film samples each containing 0.25% or 0.5% by weight of the compound were tested by heat aging, outdoor exposure and Fadeometer. Resulting data are presented in Table I.

In the heat aging test, polypropylene film samples five mils in thickness were maintained in an oven at 133° C. Each sample was tested for loss of elongation three times a day until the film tore easily. The number of days shown on the table are the total elapsed days before the film tested lost its tensile strength and flexibility. It will be seen from the table that the compound increased the heat stability of the polypropylene by a factor of about 70.

In the outdoor exposure test, five mil film samples of polypropylene were exposed on the laboratory at Emeryville, California, and periodically tested by bending through 180°. The number of weeks required before the films so tested snapped on bending is shown in the table. It will be seen that the compound increased the weather stability of the polypropylene by a factor of about 6.

In the accelerated Fadeometer test, the conventional Atlas Weatherometer wherein the arc light source has been supplemented by addition of eight fluorescent ultraviolet light sources, all film samples tested pass within a quarter inch of the light sources. It has been found that in this accelerated exposure test, conditions are approximately eight times as stringent as in the unmodified Weatherometer. It will be seen from the table that under these extreme conditions use of the phenols of the invention more than doubles the ultraviolet light stability of the polypropylene.

Table I

| Additive, percent weight | Heat Aging, Days | Outdoor Exposure, Weeks | Accelerated Fadeometer, Hours |
|---|---|---|---|
| None | <0.5 | ~0.5 | ~30 |
| 0.25 | 30 | 3.5 | 78 |
| 0.5 | 37 | 3.0 | 78 |

EXAMPLE IV

A sample of the compound of Example I was tested in white mineral oil at 150° C. by the Dornte method; see I and EC, 34, 927 (1942). The results of this test are set forth in Table II below.

Table II

| Additive | Concentration, Percent Weight | Induction Period, Hours |
|---|---|---|
| None | 0 | 1 |
| 1,3,5-trimethyl-2,4,6-tri(3,5-di-tert-butyl-4-hydroxybenzyl)benzene | 0.29 | 19.5 |

It will be seen from these data that with the aid of the hexa-substituted benzene of the invention an improvement in oxidation stability by a factor of almost 20 was obtained.

EXAMPLE V

When samples of natural rubber, each containing 1% w. of one of the substituted benzenes of Examples I and II are exposed to sunlight and oxygen, such samples have considerably more resistance to cracking, checking and tearing than rubber samples containing no stabilizing agent.

EXAMPLE VI

Using the gravimetric procedure of Olcott and Einsett, J. Am. Oil Chemist's Soc., 35, 161 (1958), the effectiveness of several antioxidants in safflower oil was determined. Samples of safflower oil containing 0.02% w. of the candidate compounds were stored in an oven at 50° C. and weighed daily until a rapid increase in weight was observed. The data showing the relative effectiveness of the anti-oxidants examined are presented in the following table. Data presented are days to rancidity.

Table III

| Antioxidant | Days to Rancidity, 50° C. |
|---|---|
| None | 5¾ |
| Bis(3,5-di-tert-butyl-4-hydroxyphenyl)methane | 7¼ |
| 1,3,5-trimethyl-2,4,6-tri(3,5-di-tert-butyl-4-hydroxybenzyl)-benzene | 9 |

We claim as our invention:

1. The polynuclear polyphenol having a benzene ring substituted with three 3,5-dialkyl-4-hydroxybenzyl radicals and with three alkyl radicals, each of said alkyl radicals having up to 8 carbon atoms.

2. 1,3,5 - trialkyl-2,4,6-tri(3,5-di-tert-alkyl-4-hydroxybenzyl) benzene, each alkyl radical having up to 8 carbon atoms.

3. 1,3,5 - trimethyl - 2,4,6 - tri(3,5 - di - tert - butyl-4-hydroxybenzyl)benzene.

4. The composition consisting essentially of an organic material normally subject to oxidative deterioration containing a stabilizing amount of the polynuclear polyphenol having a benzene ring substituted with three 3,5-dialkyl-4-hydroxybenzyl racicals, at least one of said alkyl radicals having from 3 to 8 carbon atoms and being branched on the alpha carbon atom, and with three alkyl radicals, each alkyl radical having up to 8 carbon atoms.

5. The composition consisting essentially of a polymerized alpha-olefin containing a stabilizing amount of the polynuclear polyphenol having a benzene ring substituted with three 3,5-dialkyl-4-hydroxybenzyl radicals, both of said alkyl radicals having from 3 to 8 carbon atoms and being branched on the alpha carbon atom, and with three alkyl radicals, each alkyl radical having up to 8 carbon atoms.

6. The composition of claim 5 wherein the polymerized alpha-olefin is polypropylene.

7. The composition consisting essentially of polypropylene containing a stabilizing amount of 1,3,5-trimethyl - 2,4,6 - tri(3,5 - di - tert - butyl - 4 - hydroxybenzyl benzene.

8. The composition consisting essentially of a normally liquid petroleum hydrocarbon containing a stabilizing amount of tri(3,5-di-tert-alkyl-4-hydroxybenzyl)trialkylbenzene, each alkyl radical having up to 8 carbon atoms.

9. The composition consisting essentially of a normally liquid petroleum hydrocarbon containing a stabilizing amount of 1,3,5 - trimethyl - 2,4,6 - tri(3,5 - di - tert-butyl-4-hydroxybenzyl)benzene.

10. The process for preparing trialkyl tri(3,5-dialkyl-4-hydroxybenzyl)benzene which comprises reacting in the liquid phase trialkylbenzene having a replaceable hydrogen atom on each of three ring carbon atoms with 3,5-dialkyl-4-hydroxybenzyl alcohol, each alkyl radical having up to 8 carbon atoms, under alkylating conditions in the presence of a catalytic amount of a catalyst selected from the group consisting of sulfuric acid and Friedel-Crafts catalysts.

11. The process of claim 10 wherein the catalyst is sulfuric acid.

12. The process of claim 10 wherein the catalyst is a Friedel-Crafts catalyst.

13. The process for preparing 1,3,5-trimethyl-2,4,6-tri(3,5-di-tert-butyl - 4 - hydroxybenzyl)benzene, which comprises reacting in the liquid phase trimethylbenzene with 3,5-di-tert-butyl-4-hydroxybenzyl alcohol under alkylating conditions in the presence of a catalytic amount of sulfuric acid.

14. An alpha-olefin polymer containing from about 0.005 to about 1% by weight of the polynuclear polyphenol having a benzene ring substituted with three 3,5-dialkyl-4-hydroxybenzyl radicals, each of said alkyl radicals having from 3 to 8 carbon atoms and being branched on the alpha carbon atom, and with three alkyl radicals, each of said alkyl radicals having up to 8 carbon atoms.

15. An alpha-olefin polymer prepared by a low pressure polymerization method and containing catalyst residues from the group consisting of transition metals of Groups IV to VI and metals of Groups I to III of the Mendelyeev Periodic Table, containing from about 0.005 to about 1% by weight of the polynuclear polyphenol having a benzene ring substituted with three 3,5-dialkyl-4-hydroxybenzyl radicals, each of said alkyl radicals having from 3 to 8 carbon atoms and being branched on the alpha carbon atom, and with three alkyl radicals, each of said alkyl radicals having up to 8 carbon atoms.

16. Polypropylene containing from about 0.005 to about 1% by weight of 1,3,5-trimethyl-2,4,6-tri(3,5-di-tert-butyl-4-hydroxybenzyl)benzene.

17. Polypropylene prepared by a low pressure polymerization method and containing catalyst residues from the group consisting of transition metals of Groups IV to VI and metals of Groups I to III of the Mendelyeev Periodic Table, containing from about 0.005 to about 1% by weight of 1,3,5-trimethyl-2,4,6-tri(3,5-di-tert-butyl-4-hydroxybenzyl)benzene.

18. The composition comprising a substance selected from the group consisting of natural fats and oils containing a stabilizing amount of 1,3,5-trimethyl-2,4,6-tri(3,5-di-tert-butyl-4-hydroxybenzyl)benzene.

19. Rubber containing a stabilizing amount of 1,3,5-trimethyl - 2,4,6 - tri(3,5 - di - tert - butyl - 4 - hydroxybenzyl)benzene.

No references cited.